United States Patent [19]

Shulman

[11] Patent Number: 4,659,018

[45] Date of Patent: Apr. 21, 1987

[54] ORBITING NOZZLE DISPERSION APPARATUS

[75] Inventor: Burt H. Shulman, Poughkeepsie, N.Y.

[73] Assignee: Westinghouse Electric Corp., Pittsburgh, Pa.

[21] Appl. No.: 739,939

[22] Filed: May 31, 1985

[51] Int. Cl.$^4$ .......................... B05B 3/00; B05B 1/34; B25J 11/00

[52] U.S. Cl. .................................. 239/264; 239/380; 239/225.1; 901/43

[58] Field of Search .............. 239/102, 104, 120, 121, 239/225, 264, 380; 901/43

[56] References Cited

U.S. PATENT DOCUMENTS

| | | | |
|---|---|---|---|
| 3,834,625 | 9/1974 | Barthod-Malat | 239/264 X |
| 3,917,170 | 11/1975 | Marino | 239/195 X |
| 4,239,431 | 12/1980 | Davini . | |
| 4,369,850 | 1/1983 | Barker | 239/227 X |
| 4,402,991 | 9/1983 | Meisner . | |

FOREIGN PATENT DOCUMENTS 1933147 1/1971 Fed. Rep. of Germany .
3005677 8/1981 Fed. Rep. of Germany .
2129086 5/1984 United Kingdom .

OTHER PUBLICATIONS

*News from ASEA,* a Release from ASEA Inc., 4 New King St., White Plains, N.Y. 10604, received Oct. 13, 1983.
Photograph of ASE IRB 6/2, robot received in the Scientific Library, Oct. 13, 1983.

*Primary Examiner*—Joseph F. Peters, Jr.
*Assistant Examiner*—Patrick N. Burkhart
*Attorney, Agent, or Firm*—Thomas R. Trempus

[57] ABSTRACT

An orbiting nozzle dispersion apparatus is adapted for use in combination with a robot to form a dispensing system. The orbiting nozzle dispersion apparatus has a dispensing tube with a first end for receiving the materials to be dispersed and a second or nozzle end from which the material is finally dispersed onto the workpiece. The dispensing tube is compliantly supported at one end and supported at the nozzle end for orbital but not rotational motion about an axis.

9 Claims, 5 Drawing Figures

ORBITING NOZZLE DISPERSION APPARATUS

FIELD OF THE INVENTION

This invention is directed to a means by which materials such as medium to high viscosity, thixotropic or fiber filled materials can be applied to a substrate. More particularly, this invention is directed to an orbiting nozzle dispersion apparatus for use in combination with a robot to form a dispensing system in which a ribbon of material having a variable width and thickness can be applied to a substrate from a distance of between about 1 to 6 inches and can be applied at various angles to the substrate and even applied to an overhead surface.

BACKGROUND OF THE INVENTION

The use of adhesives and sealants in the automotive industries is becoming increasingly important. Adhesives and sealants are used in the assemblies of such hem-flanged parts as doors, decks and hoods. For example, sealing materials can be used in conjunction with more conventional spot-welding techniques. The sealant is first applied and then the sheet metal is welded through the sealant. Such a combined approach has allowed the distance between spot welds to be increased while reducing the number of welds. Some manufacturers, moreover, have eliminated the welding altogether by employing structural adhesives.

However, the use of adhesives has presented several distinct disadvantages. Unless carefully applied, the use of adhesives and sealants can be a messy operation requiring manual cleanup. If too much adhesive is applied or if it is not properly covered in the hemming operation, it can contaminate the electrophoretically deposited paint primer baths that are necessary prior to painting. Additionally, excess adhesive can also contaminate hemming dies. The flanges and method for joining parts must be structured to avoid wiping the adhesive from the part once the adhesive is applied thereto. It is not possible to paint over some adhesives and sealants, amplifying the need for accurate dispensing of these materials onto the specific component piece.

Heretofore, the manual application of adhesives and sealants to assemblies has been found to be generally impractical because of the high throughput and high accuracy required. As a result, the present automotive manufacturing environment places exacting demands on systems that can automatically apply adhesives and sealants.

Adhesives and sealants must be applied accurately, along the right bead path, in the required cycle time, in the precise volume required, and with the proper cross section. Otherwise, incorrect bonding or squeezing or bead placement will occur.

A dispensing system must be designed to handle the throughput requirements of the production assembly line as well as the geometry of the workpiece. Cycle times can be as short as 3 to 4 seconds for dispensing material around the entire perimeter of a door. At constant dispensing-head velocity, an adhesive or sealant must be delivered at constant pressure and flow to produce a uniform bead.

It has been found that a robotic dispensing system can generally accommodate the aforementioned requirements and substantially alleviate the above-enumerated disadvantages of adhesive use. However, significant limitations are still found in the actual adhesive dispensing system.

It is therefore an object of this invention to provide an orbiting nozzle dispersion apparatus for the application of a pattern of adhesive material or the like. The material flow rate is adjusted by varying the pressure supplied to the nozzle. The pattern width is varied by adjusting the distance between the nozzle and the work surface. Moreover, there is substantially no change in pattern width due to pressure variations in the material flow while the nozzle is maintained within a predetermined range of the work surface.

SUMMARY OF THE INVENTION

The orbiting nozzle dispersion apparatus of this invention is adapted for use in combination with a robot dispensing system including an industrial manipulator and a material conveyance system for delivering the adhesive material or the like from a storage point to the nozzle whereupon the material is applied to the workpiece as desired. The orbiting nozzle dispersion apparatus of this invention has a dispensing tube means with a first end for receiving the materials to be dispersed and a second or nozzle end from which the material is finally dispersed onto the workpiece. A support means is provided in which the dispensing tube is disposed. A first mounting means compliantly supports the dispensing tube means at a location proximate the first end of the dispensing tube. This first mounting means is adapted to support the dispensing tube while permitting a nutating movement of that portion of the tube with respect to the support means. A second mounting means is provided for supporting the dispensing tube at a location proximate the second or nozzle end thereof. This second mounting means is mounted in the support means for rotational movement about a first fixed axis. This second mounting means supports the dispensing tube at a location proximate the nozzle end and permits orbital movement of that nozzle end about the first axis. In other words, the dispensing tube itself is not rotating but it is orbiting the first axis. Finally, motive means are operatively associated with the second mounting means for affecting the rotational movement of the second mounting means about the first axis.

BRIEF DESCRIPTION OF THE DRAWINGS

The above, as well as other features and advantages of the present invention, will become apparent through consideration of the detailed description of the preferred embodiments of this invention in conjunction with the several drawings in which.

DETAILED DESCRIPTION OF THE INVENTION

Figure 1:
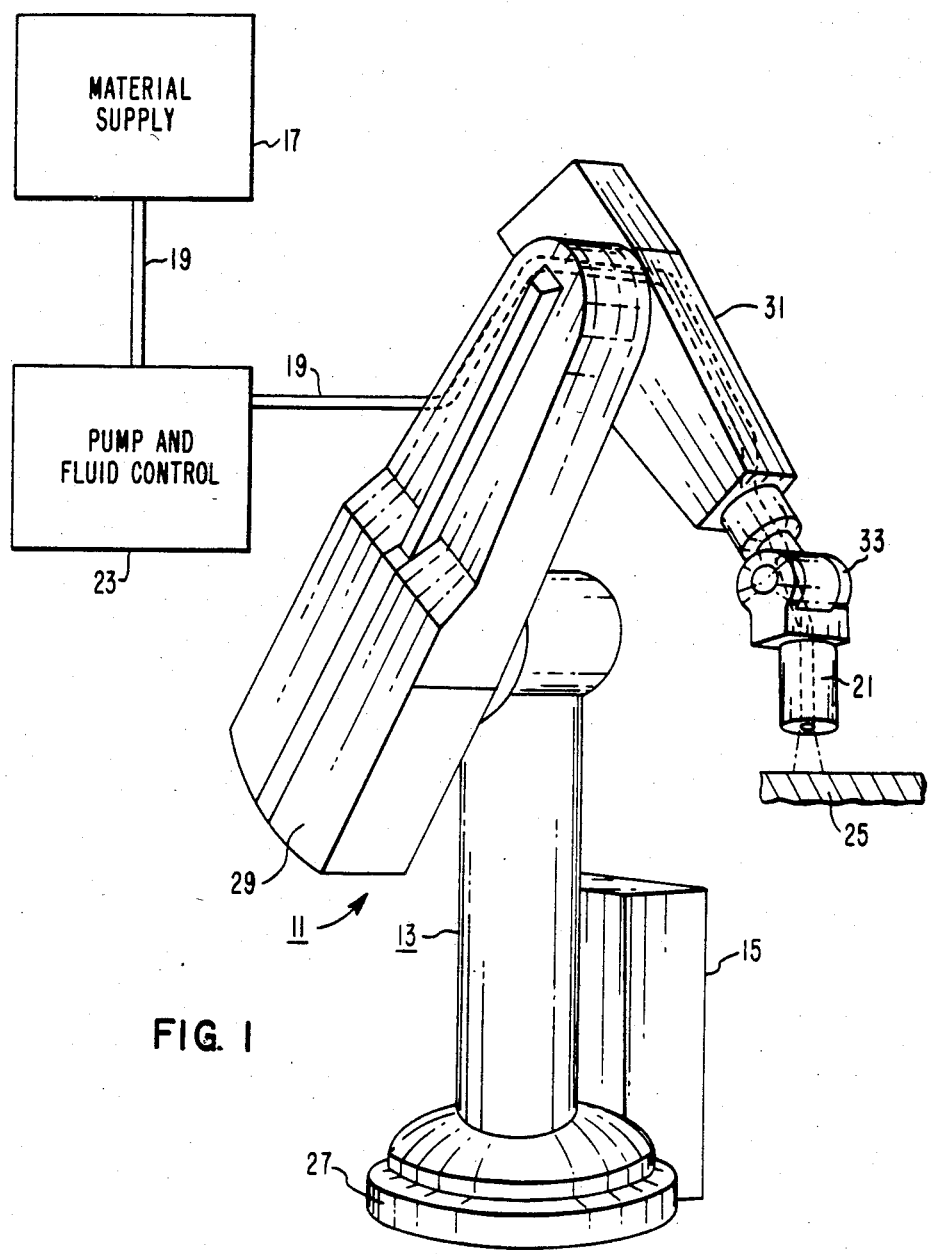
FIG. 1 is a somewhat schematical representation of a robot dispensing system incorporating the orbiting nozzle dispersion apparatus all according to the teachings of this invention.

A robotic dispensing system which incorporates the orbiting nozzle dispersion apparatus by which materials such as medium to high viscosity, thixotropic or fiber filled materials can be applied to a substrate is schematically illustrated in FIG. 1 and indicated by the reference character 11. The robotic system 11 includes a robot 13 in communication with a robot control panel 15 for applying the appropriate commands to effect the desired movement of the robot 13. A material supply means such as container 17 holds the material to be dispersed by means of the robot system. The material supply means 17 is in communication via a conduit 19 with the orbiting nozzle dispersion apparatus (ONDA) 21. A pump and fluid flow control apparatus which is schematically indicated at 23, insures that the appropriate flow of material is maintained to the ONDA nozzle 21. A workpiece 25 is positioned within the work envelope of the robot 13 for the application of the desired material thereto. The workpiece can be placed into position by a conveyor means or the like. The robot 13 includes a base portion 27 which would typically be secured to the floor of the work area, at least a first arm 29 rotatably and pivotably mounted with respect to the base portion 27, and preferably a second arm 31 rotatably mounted about one end of the arm 29 with a wrist 33 mounted onto the cantilevered end of the arm 31. The ONDA nozzle 21 would be fixedly attached to the wrist 33 for manipulation thereby. Such a wrist preferably provides several degrees of freedom for the manipulation of the ONDA nozzle 21. The conduit means 19 convey the material from the material supply 17 by way of the pump and flow control means 23 to the ONDA nozzle 21.

Figure 2:
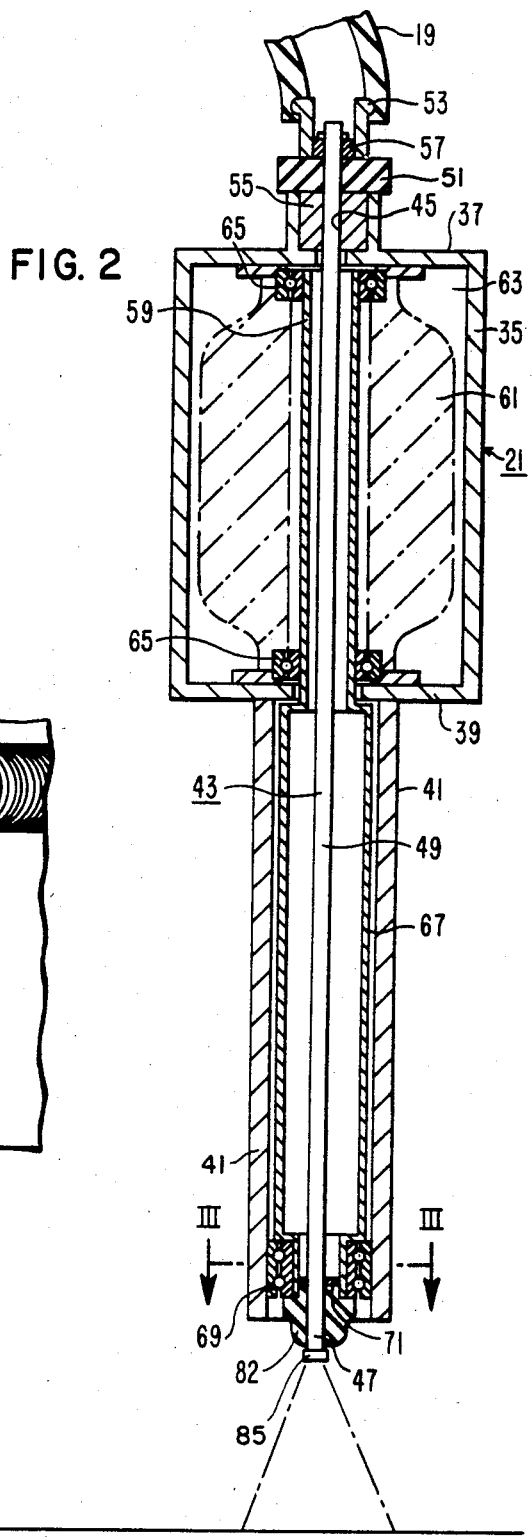
FIG. 2 is a sectional view of the orbiting nozzle dispersion apparatus according to this invention.
Figure 3:
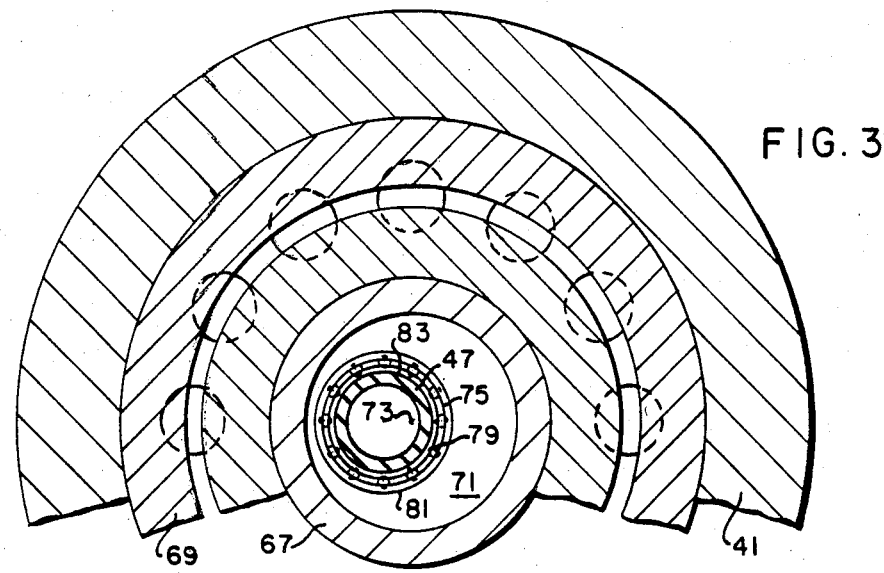
FIG. 3 is a sectional view along lines III—III of FIG. 2 illustrating the rotational mounting means through which orbital motion is effected by the orbiting nozzle dispersion apparatus.

Considering FIGS. 1 through 3, the operating principles of the ONDA nozzle can be readily appreciated. The ONDA nozzle generally indicated by the reference character 21 includes a drive means housing 35 which has at the upper end thereof a mounting means 37 adapted to permit the ONDA nozzle 21 to be removably interconnected to the wrist 33 of the robot 13. At the lower end 39 of the drive means housing 35 a support means 41 depends downwardly therefrom and provides a housing which supports the adhesive dispensing tube 43. The dispensing tube means 43 has a first end 45 for receiving therein the materials to be conveyed through the dispensing tube and dispensed therefrom and a second or nozzle end 47 from which the material is ultimately dispensed and a center portion 49 disposed therebetween. The upper portion 45 of the dispensing tube 43 is supported by an upper support means 51. The upper support means 51 includes a housing having a threaded coupling 53 at the upper end thereof adapted to receive the conduit 19 through which the material supply is pumped to the ONDA nozzle 21. The dispensing tubing is supported within the upper support housing 51 by means of a flexible mount means 55 preferably made of neoprene or a similar material which provides a relatively fixed yet flexible support for the dispensing tube 43. Gasket means 57 are provided above the flexible mount means 55 in order to inhibit the flow of adhesive material down about the outside of the dispensing tube 43 into the drive means housing or other portions of the ONDA nozzle 21. The flexible mount means 55 permits the nutational movement of the upper portion of the dispensing tube 45 within the upper housing 51.

In the preferred embodiment of this invention, the ONDA nozzle 21 provides a dispensing tube 43 spacedly disposed within a hollow rotor drive shaft 59 of a motor 61. The drive housing 35 supports the stator windings 63 of the motor 61. Bearings as at 65 support the rotor within the drive housing 35.

A hollow shaft member 67 is supported within the support means 41 by a bearing set 69. The shaft 67 is operatively associated with the rotor drive shaft 59 of the drive means 61. It is possible, for example, to provide an integral rotor drive shaft and support shaft 67.

The technique by which the dispensing tube means 43 is supported within the support tube member 67 can be more readily appreciated by consideration of FIG. 3 which is a sectional view along lines III—III of FIG. 2. The lower or second mounting means 71 is mounted proximate the bottom of the extending shaft 67. As can be seen in FIG. 3 the bearing set 69 facilitates the rotational movement of the shaft 67 with respect to the support means 41 as affected by the drive means 61. The lower or second mounting means 71 has a first axis 73 therewith which is the rotational axis of the drive means 61. The dispensing tube 43 and more particularly the nozzle portion or lower portion 47 of the dispensing tube 43 is mounted in a bore 75 which is disposed off-axis with respect to the axis 73 in the lower mounting means 71. The dispensing tube nozzle 47 is supported within the lower mounting means 71 by means of the bearing set 79 disposed between the off-axis bore wall 81 and the outside wall 83 of the tubular member 43. A boot 82 encloses the lower mounting means 71 to protect the various hearing sets. A sized output nozzle as at 85 has a bore 87 of a predetermined diameter which is smaller than the diameter of the dispensing tube. Several such nozzles 85 can be provided, each having a unique bore diameter, for selected insertion into the nozzle 47. Through the aforedescribed mounting configuration, the second mounting means 71 is mounted in the support means 41 for rotational movement about a first axis 73. The second mounting means 71 supports the dispensing tube 43 at a portion thereof proximate the nozzle end 47 for orbital movement about the first axis 73. It should be appreciated that because the upper portion 45 of the dispensing nozzle 43 is maintained in a substantially fixed position which facilitates only the nutational movement of the upper portion 45 of the dispensing tube 43, the nozzle portion 47 of the dispensing tube 43 is only moving in orbital motion about the axis 73. Accordingly, no rotational movement is being imparted to the dispensing tube as it orbits about the axis 73 due to the rotational movement of the lower or second mounting means 71 with respect to the support means 41. In other words, the nozzle portion 47 is moved in an orbital path or a continuous displacement about a fixed axis defined by the rotational movement of the lower supporting member 71 of the rotating shaft 67.

The ONDA nozzle of this invention provides several unique advantages over the techniques and apparatuses heretofore available. Initially it should be appreciated that an elongated nozzle portion of the preferred embodiment shown in FIGS. 1 and 2 represents a materials delivery system with low work space intrusion. The nozzle is omnidirectional in that there is no need to orient the nozzle with respect to the workpiece because the nozzle can be maintained a predetermined distance from the workpiece whereas extrusion devices have to physically contact the workpiece. This device provides good seam penetration because of the high impact velocity and high inertia of a cylindrical stream as opposed to the conventional techniques of materials application. For example, devices using a spray technique emit droplets which have a high surface tension to mass. As a result, these droplets tend to bounce off rather than penetrate the seam area or workpiece. There is no overspray as with conventional devices. You can accurately and specifically place the material at a desired location on the workpiece. As shown in FIG. 2, this ONDA nozzle provides a stable fan with a flow rate change that can vary from 5 to 1. The upper limit of the flow rate is controlled by the maximum pressure which can be delivered to the nozzle. The lower limit of the flow rate is controlled by the minimum exit velocity needed to maintain pattern width. Because of the unique features described above, the ONDA nozzle can be utilized to effectively penetrate seams and workpieces where appropriate even when disposed in an upside down relationship with that workpiece. This is due to the fact that this ONDA nozzle delivers a high mass of material with low surface tension. The ONDA nozzle combines the most advantageous features of spray deposition and extrusion techniques in the application of an adhesive material to a workpiece or the penetration of the adhesive material into the seam of two abutting workpieces.

Figure 4:
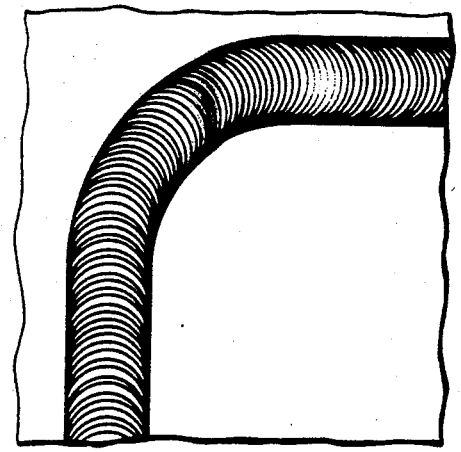
FIG. 4 is a plan view of the dispersion pattern of material deposited by means of the orbiting nozzle dispersion apparatus of this invention.

In the preferred embodiment as shown in FIGS. 2 and 3, it is expected that the radius of the orbit of the nozzle about the fixed axis in relationship to the diameter of the nozzle is approximately 20% greater than the diameter of the exit orifice. The cone angle as shown in FIG. 2 would be approximately 45° or less. The nozzle would be positioned approximately 1¼ inches above the work surface and the orbital motion of the nozzle about the fixed axis would dispense a ribbon of material as illustrated in FIG. 4 of approximately 1 inch in width. The pattern width changes are minimal even with increased flow rate or exit velocity of the material due to the control of the distance between the exit point of the nozzle and the workpiece.

Figure 5:
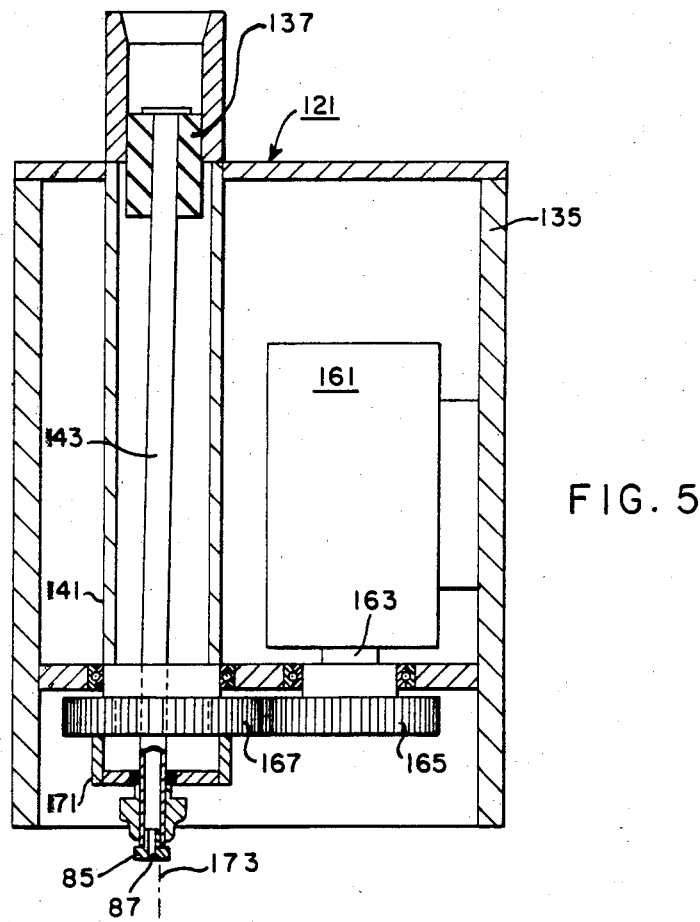
FIG. 5 is an elevational, sectional view of an alternative embodiment of the orbiting nozzle dispersion apparatus of this invention.

An alternative embodiment of the ONDA nozzle of this invention is generally indicated by the reference character 121 in FIG. 5. This alternative ONDA nozzle 121 includes a drive housing 135 in which both the drive means 161 and the tubular support means 141 for the dispensing tube 143 are located. The tubular support means 141 includes an upper mounting means 137 and a lower support means. The housing 135 is a generally rectangular structure which encloses a synchronous motor, preferably a 24,000 rpm synchronous motor 161. The output shaft 163 of the synchronous motor 161 has a spur gear 165 mounted thereon which is in communication with a second spur gear 167 by which the orbiting motion of the nozzle portion 147 is effected. The second spur gear 167 has a central bore therein adapted to accommodate the orbital movement of the dispensing tube means 143. Similar to the configuration described in association with the preferred embodiment of the ONDA nozzle 21, the lower or second mounting means 171 by which the dispensing nozzle is supported has an axis thereon 173 about which the ONDA nozzle orbits. This alternative embodiment is convenient for use in applications in which the workpiece is readily accessible. Such applications might include disposing an adhesive material about the outside edge of a windshield or the like.

What has been described is an orbiting nozzle dispersion apparatus by which materials such as medium to high viscosity, thixotropic or fiber filled materials can be applied to a substrate. The dispersion pattern is typically a ribbon of variable width and thickness. The pattern is applied to the substrate from a distance of about 1 inch to 6 inches and can be applied at various angles to the substrate and even applied to an overhead surface. The pattern can be applied in any direction without reorienting the orbiting nozzle dispersion apparatus of this invention. The material flow rate is simply adjusted by varying the pressure supplied to the ONDA. The pattern width is varied by adjusting the distance between the ONDA and the work surface.

What is claimed is:

1. An orbiting nozzle dispersion apparatus for the application of adhesives or sealants to a substrate comprising:
    dispensing tube means having a first end for receiving materials to be dispersed thereinto and a second, nozzle end from which the material is dispersed;
    drive means housing having a lower end and an upper end;
    support means extending from the lower end of said drive means housing and in which said dispensing tube means is disposed;
    a first mounting means at the upper end of said drive means housing means for compliantly supporting said dispensing tube means for non-rotational movement at a location proximate said first end thereof, said first mounting means facilitating orbital movement of said second end of said dispensing tube means;
    a second mounting means for supporting said dispensing tube means at a location proximate said second, nozzle end within said support means, said second mounting means being mounted in said support means for rotational movement about a first axis and having a bore therethrough which is offset with respect to said first axis, said second mounting means supporting said dispensing tube at a location proximate said second, nozzle end within said bore by bearing means for orbital movement about said first axes; and
    motive means mounted in said drive means housing operatively associated with said second mounting means for affecting the rotational movement of said second mounting means, said motive means including a motor having a hollow rotor drive shaft which has a bottom portion extending from the motor and through which the dispensing tube means depends and wherein the second mounting means is fixedly mounted in the bottom of the extending portion, whereby rotational movement about the first axis is imparted to the second mounting means by rotation of the rotor drive shaft such that the rotational movement of said second mounting means imparts orbital movement to said second, nozzle end of the dispensing tube means about the first axis.

2. The orbiting nozzle dispersion apparatus according to claim 1 wherein the first mounting means consists of neoprene.

3. The orbiting nozzle dispersion apparatus according to claim 1 wherein the motive means is a synchronous motor.

4. The orbiting nozzle dispersion apparatus according to claim 1 including a sized output nozzle having a bore of a predetermined diameter therein removably disposed in the second end of the dispensing tube means.

5. In combination with a robot having at least an arm adapted to receive an end effector or the like thereon, an orbiting nozzle dispersion apparatus for the application of adhesives or sealants to a substrate, operably associated with the arm of said robot, said orbiting nozzle dispersion apparatus comprising:

dispensing tube means having a first end for receiving materials to be dispersed thereinto and a second, nozzle end from which the material is dispersed;

drive means housing having a lower end and an upper end;

support means extending from the lower end of said drive means housing and in which said dispensing tube means is disposed;

a first mounting means at the upper end of said drive means housing means for compliantly supporting said dispensing tube means for non-rotational movement at a location proximate said first end thereof, said first mounting means facilitating orbital movement of said second end of said dispensing tube means;

a second mounting means for supporting said dispensing tube means at a location proximate said second, nozzle end within said support means, said second mounting means being mounted in said support means for rotational movement about a first axis and having a bore therethrough which is offset with respect to said first axis, said second mounting means supporting said dispensing tube at a location proximate said second, nozzle end within said bore by bearing means for orbital movement about said first axes; and motive means mounted in said drive means housing operatively associated with said second mounting means for affecting the rotational movement of said second mounting means, said motive means including a motor having a hollow rotor drive shaft which has a bottom portion extending from the motor and through which the dispensing tube means depends and wherein the second mounting means is fixedly mounted in the bottom of the extending portion, whereby rotational movement about the first axis is imparted to the second mounting means by rotation of the rotor drive shaft such that the rotational movement of said second mounting means imparts orbital movement to said second, nozzle end of the dispensing tube means about the first axis.

6. The combination according to claim 5 wherein the first mounting means consists of neoprene.

7. The combination according to claim 5 wherein the motive means is a synchronous motor.

8. The combination according to claim 5 including a robot control means in communication with the robot to effect the desired movement of the robot; and a material supply means including pump and material flow control means in communication with the orbiting nozzle dispersion apparatus for the delivery of material thereto.

9. A material dispensing system for the application of adhesives or sealants to a substrate comprising in combination: a robot having an arm adapted to receive an end effector on the end thereof; robot control means in communication with said robot for affecting the desired movement thereof; and a material supply means including pump and material flow control means for the delivery of material to a material dispersion apparatus, which material dispersion apparatus is an orbiting nozzle dispersion apparatus comprising:

dispensing tube means having a first end for receiving materials to be dispersed thereinto and a second, nozzle end from which the material is dispersed;

drive means housing having a lower end and an upper end;

support means extending from the lower end of said drive means housing and in which said dispensing tube means is disposed;

a first mounting means at the upper end of said drive means housing means for compliantly supporting said dispensing tube means for non-rotational movement at a location proximate said first end thereof, said first mounting means facilitating orbital movement of said second end of said dispensing tube means;

a second mounting means for supporting said dispensing tube means at a location proximate said second, nozzle end within said support means, said second mounting mmeans being mounted in said support means for rotational movement about a first axis and having a bore therethrough which is offset with respect to said first axis, said second mounting means supporting said dispensing tube at a location proximate said second, nozzle end within said bore by bearing means for orbital movement about said first axes; and motive means mounted in said drive means housing operatively associated with said second mounting means for affecting the rotational movement of said second mounting means, said motive means including a motor having a hollow rotor drive shaft which has a bottom portion extending from the motor and through which the dispensing tube means depends and wherein the second mounting means is fixedly mounted in the bottom of the extending portion, whereby rotational movement about the first axis is imparted to the second mounting menas by rotation of the rotor drive shaft such that the rotational movement of said second mounting means imparts orbital movement to said second, nozzle end of the dispensing tube means about the first axis.

* * * * *